United States Patent
Herrmann et al.

(10) Patent No.: US 10,174,212 B2
(45) Date of Patent: Jan. 8, 2019

(54) METHOD FOR PRODUCING A PIGMENT PASTE, AQUEOUS ELECTROCOAT MATERIAL, USE THEREOF, METHOD FOR CATAPHORETIC ELECTROCOATING, AND COATED ARTICLE

(71) Applicants: BASF COATINGS GmbH, Muenster (DE); Henkel AG & Company, KGaA, Duesseldorf (DE)

(72) Inventors: Ute Herrmann, Wuppertal (DE); Sebastian Sinnwell, Duesseldorf (DE); Thorsten Gelbrich, Muenster (DE); Konstantinos Markou, Cologne (DE); Rolf Schulte, Senden (DE); Sabine Holtschulte, Ascheberg (DE); Dominik Stoll, Muenster (DE); Guenther Ott, Muenster (DE)

(73) Assignees: BASF Coatings GmbH, Münster (DE); Henkel AG & Company, KGaA, Düsseldorf (DE)

( * ) Notice: Subject to any disclaimer, the term of this patent is extended or adjusted under 35 U.S.C. 154(b) by 263 days.

(21) Appl. No.: 15/106,574

(22) PCT Filed: Dec. 20, 2013

(86) PCT No.: PCT/EP2013/077808
§ 371 (c)(1),
(2) Date: Jun. 20, 2016

(87) PCT Pub. No.: WO2015/090469
PCT Pub. Date: Jun. 25, 2015

(65) Prior Publication Data
US 2016/0333197 A1    Nov. 17, 2016

(51) Int. Cl.
| | | |
|---|---|---|
| C09D 5/44 | (2006.01) |
| C09C 1/30 | (2006.01) |
| C09C 1/36 | (2006.01) |
| C09D 5/08 | (2006.01) |
| C09D 17/00 | (2006.01) |
| C09D 163/00 | (2006.01) |
| C25D 13/06 | (2006.01) |
| C25D 13/12 | (2006.01) |
| C25D 13/18 | (2006.01) |
| C09D 5/02 | (2006.01) |
| C25D 13/22 | (2006.01) |

(52) U.S. Cl.
CPC .......... *C09D 5/4457* (2013.01); *C09C 1/3072* (2013.01); *C09C 1/3623* (2013.01); *C09D 5/02* (2013.01); *C09D 5/086* (2013.01); *C09D 5/4473* (2013.01); *C09D 5/4492* (2013.01); *C09D 17/00* (2013.01); *C09D 17/001* (2013.01); *C09D 17/003* (2013.01); *C09D 163/00* (2013.01); *C25D 13/06* (2013.01); *C25D 13/12* (2013.01); *C25D 13/18* (2013.01); *C25D 13/22* (2013.01)

(58) Field of Classification Search
CPC .... C09C 1/3072; C09C 1/3623; C09D 5/4457
See application file for complete search history.

(56) References Cited

U.S. PATENT DOCUMENTS

| | | | |
|---|---|---|---|
| 5,324,404 A | 6/1994 | Ott et al. | |
| 5,739,217 A * | 4/1998 | Hagiwara | ............... C08L 63/00 257/E23.12 |
| 6,083,373 A | 7/2000 | McMurdie et al. | |
| 2011/0266155 A1 | 11/2011 | Baumgart et al. | |

FOREIGN PATENT DOCUMENTS

| | | |
|---|---|---|
| DE | 39 42 766 A1 | 6/1991 |
| DE | 196 28 142 A1 | 1/1998 |
| DE | 196 28 143 A1 | 1/1998 |
| DE | 10 2008 023 444 A1 | 11/2009 |
| EP | 0 305 060 A2 | 3/1989 |
| EP | 0 560 189 A2 | 9/1993 |
| JP | 3-6296 A | 1/1991 |
| JP | 2009-73933 | 4/2009 |
| WO | 82/00148 A1 | 1/1982 |
| WO | 98/02466 A1 | 1/1998 |
| WO | 00/03070 A2 | 1/2000 |
| WO | 2008/088151 A1 | 7/2008 |

OTHER PUBLICATIONS

Machine translation of JP 2009-073933 A, published Apr. 9, 2009. (Year: 2009).*
International Search Report dated Jun. 27, 2014 in PCT/EP2013/077808 filed Dec. 20, 2013.

* cited by examiner

*Primary Examiner* — Vickey Nerangis
(74) *Attorney, Agent, or Firm* — Oblon, McClelland, Maier & Neustadt, L.L.P.

(57) ABSTRACT

The invention relates to a method for producing a pigment paste and an electrocoat containing the paste, the past being made by mixing solid pigment particles with a grind resin in the presence of water and/or an organic liquid, wherein the grind resin includes a dispersion of core-shell particles in an epoxide prepolymer which is liquid at 20° C. and the core-shell particles have a silicone core and a polymer shell.

15 Claims, No Drawings

METHOD FOR PRODUCING A PIGMENT PASTE, AQUEOUS ELECTROCOAT MATERIAL, USE THEREOF, METHOD FOR CATAPHORETIC ELECTROCOATING, AND COATED ARTICLE

The present invention relates to a method for producing a pigment paste by mixing at least one pigment, consisting of solid particles, with a grind resin in the presence of water and/or an organic liquid. The invention also relates to a pigment paste obtainable by the method, to an aqueous electrocoat material which comprises the pigment paste, to the use of the electrocoat material, to a method for cataphoretic electrocoating, and to an article coated by the method.

Pigment pastes are also referred to as milling paste, grinding material, or millbase. In the production of paints and printing inks, this millbase comprises the part of the formula that includes the pigments and fillers for dispersion, and also the binders, solvents, and additives required for their dispersing (Römpp Lexikon, Lacke und Druckfarben, Georg Thieme Verlag, 10th edition 1998). Pigment pastes, accordingly, are used in the pigmenting of paints, varnishes, and printing inks which comprise a curable resin system.

The function of a grind resin is to wet the pigment surface and, by so doing, to improve the dispersing of the pigment particles into inks and paints, for example, more particularly into water-based inks and paints. Additionally, the grind resin has reactive groups which when the resin system of the inks or paints is cured, are able to react with components of the resin system and so incorporate the pigment particles firmly into the fully cured resin. For the purposes of the present invention, they comprise, in particular, pigment pastes which are employed in electrocoat materials. Relative to the typical standard grind resin in the preferred field of use, the grind resin in question here is notable in particular for the fact that in the cathodic electrocoating of aluminum surfaces, a reduction is achieved in paint defects (so-called pinholes).

Core-shell particles, generally in dispersion in a carrier liquid, are known additives for increasing the strength and/or impact resistance (so-called toughening agents) in resin systems, such as in adhesives, paints, and coating materials, for example.

JP 03-006296 A discloses the use of core-shell particles for producing a matt cathodically depositable electrocoat composition. The particles consist of a core of hydrophobic polymer with a gel fraction of 20-100%, obtained by polymerizing a hydrophobic monomer, a crosslinking monomer, and optionally a "craft-crosslinking" monomer, and a shell of a hydrophilic polymer having a Tg of 10-35° C. and "water-dispersible functional groups", obtainable by polymerizing an ethylenically unsaturated carboxylic acid and a monomer having a glass transition temperature of below 30° C. The object of this invention, accordingly, is to provide a cathodic electrocoat having a matt appearance.

EP 305060 A2 discloses a detailed preparation procedure for core-shell particles and a cataphoretically depositable resin mixture based on a polyol resin, this mixture comprising the core-shell particles prepared accordingly. The core-shell particles are obtainable by polymerizing a) a hydroxyl-containing, alpha,beta-ethylenically unsaturated monomer (claim 2: (meth)-acrylic esters with further polyether or polyester groups and with terminal —OH), b) a polyfunctional, alpha,beta-ethylenically unsaturated monomer, and c) a further alpha,beta-ethylenically unsaturated monomer, different from a) and b). The core-shell particles are obtained by first polymerizing only b) and c) and then polymerizing remaining b) and c) together with a). Hence the core ought to consist of polyolefin, while the shell comprises an acrylate component.

EP 560189 A2 discloses "synthetic resins" from a broad chemical spectrum that comprise core-shell polymers. Present additionally may be crosslinkers, pigments, and other adjuvants. Further details of the core-shell particle are brought together in claims 3 and 4 of this document:

Variant as Per Claim 3:

The core is obtainable by polymerizing at least one conjugated diene, at least one vinylaromatic monomer, and optionally a di- to polyethylenically unsaturated monomer having at least one nonconjugated double bond. The shell is obtainable by polymerizing at least one vinylaromatic monomer, at least one alkyl methacrylate, and optionally further acrylates and/or di- to polyethylenically unsaturated monomers having at least one nonconjugated double bond, and/or "further monomers". The core ought therefore to consist of polyolefin, while the shell comprises an acrylate component.

Variant as Per Claim 4:

The core is obtainable by polymerizing at least one vinylaromatic monomer with (in each optionally) the following: alkyl (meth)acrylate, di- to polyethylenically unsaturated monomers having at least one nonconjugated double bond, and/or "further monomers". A first shell is obtainable by polymerizing at least one conjugated diene, at least one vinylaromatic monomer, and optionally di- to polyethylenically unsaturated monomers having at least one nonconjugated double bond, and/or "further monomers". A second shell is obtainable by polymerizing at least one vinylaromatic monomer, at least one alkyl methacrylate, and optionally further acrylates and/or di- to polyethylenically unsaturated monomers having at least one nonconjugated double bond, and/or "further monomers".

Known accordingly is the use of core-shell particles having a polyolefin core in paints, including cathodically depositable electrocoat materials. None of the abovementioned documents, however, mentions the problem that paint defects, so-called pinholes, may frequently occur, especially in the cathodic electrocoating of aluminum surfaces. Pinholes are small holes in the paint finish that lead to a deterioration in corrosion prevention. As a result of the present invention, which is based on a selection of specific core-shell particles, this disadvantage is largely avoided. Another advantage of this invention is that the specifically selected core-shell particles are readily incorporable into pigment pastes.

The objective of the comparative experiments was to show that through the use of core-shell particles having different cores in different concentrations, the extent to which the nature of the coating is improved is different. More particularly, the use of core-shell particles with a silicone core led to a significant reduction in defects (so-called pinholes) on aluminum surfaces and to an improvement in corrosion prevention.

The present invention accordingly provides a method of the type specified at the outset for producing a pigment paste, wherein the grind resin comprises a dispersion of core-shell particles in an epoxide prepolymer which is liquid at 20° C., or consists of such a dispersion, and the core-shell particles have a silicone core and a polymer shell.

Core-shell particles having a silicone core and a polymer shell are available commercially as traded products from Kaneka, for example, under the Kane Ace® MX 960 name. The products comprise a dispersion of the particles in a liquid epoxy resin.

The mixture prepared by the method of the invention is advantageously homogenized. In the course of the homogenization, the pigment particles are comminuted to a preselected particle size and dispersed advantageously by introduction of mechanical energy.

The polymer shell of the core-shell particles advantageously comprises poly(meth)acrylates.

The liquid epoxide prepolymer in which the core-shell particles are present advantageously has an epoxy equivalent weight in the range from 150 to 300 g/eq.

The dispersion of core-shell particles in an epoxide prepolymer which is liquid at 20° C. is used advantageously in an amount such that the completed pigment paste comprises 1-6 wt % of core-shell particles, based on the total amount of the grind resin.

The invention also relates to a pigment paste obtainable by a method as disclosed herein.

The invention further relates to an aqueous electrocoat material which comprises a cataphoretically depositable resin system and a pigment paste of the invention.

The resin system of the aqueous electrocoat material advantageously comprises epoxide-based monomers or prepolymers and at least one curing agent for epoxides.

In one preferred embodiment the electrocoat of the invention is in the form of a miniemulsion.

Miniemulsions are dispersions of water, an oil phase, and one or more surface-active substances where the particles present in dispersion have an average particle diameter of 5 to 500 nm. Miniemulsions are considered to be metastable (cf. Emulsion Polymerization and Emulsion Polymers, Editors P. A. Lovell and Mohamed S. El-Aasser, John Wiley and Sons, Chichester, N.Y., Weinheim, 1997, pages 700ff.; Mohamed S. El-Aasser, Advances in Emulsion Polymerization and Latex Technology, 30th Annual Short Course, Volume 3, Jun. 7-11, 1999, Emulsion Polymers Institute, Lehigh University, Bethlehem, Pa., U.S.A.). The miniemulsions, as they are called, find broad application in the art in, for example, cleaning products, cosmetics, or bodycare products, but also in coating material compositions such as electrocoat materials, for example The preparation of aqueous primary dispersions by means of miniemulsion polymerization is known from, for example, international patent applications WO 82/00148 and WO 98/02466 or from German patent applications DE 196 28 143 A 1 and DE 196 28 142 A 2. In the case of these known processes, the monomers can be copolymerized in the presence of various low molecular mass, oligomeric, or polymeric hydrophobic substances or costabilizers (cf. DE 196 28 142 A 2). Moreover, hydrophobic organic auxiliaries with little solubility in water, such as plasticizers, film-forming assistants such as coalescers, for example, or other organic additives may be incorporated into the monomer droplets of the miniemulsion (cf. DE 196 28 143 A 1). WO 82/00148 describes by way of example the use of emulsifiers to stabilize the emulsions disclosed therein.

WO 82/00148 discloses in particular the preparation of cathodically depositable resin emulsions, including miniemulsions, using cationically adjustable emulsifiers which attach to the surface of the particles and give them a positive charge, which stabilizes the emulsion at pH levels below 10. The emulsifiers may carry reactive groups, through which they can be incorporated into the polymeric resin system during the crosslinking reaction. Examples given explicitly for emulsifiers are the acetic acid salts of fatty monoamines and fatty diamines such as primary tallow- and oleylamines, or the acetic acid salts of tallow- and oleyldiamines. Tallow- and oleylamines contain hydrocarbon chains having at least one carbon-carbon double bond. Polymeric emulsifiers as well can be used, such as an epoxy-phenol adduct which has been reacted with diethanolamine and rendered cationic using acetic acid, for example. A coemulsifier used in certain working examples in WO 82/00148 is Ethoduomeen™ T13, which represents a tertiary amine with an unsaturated alkyl radical. According to information from the manufacturer, AkzoNobel, the compound in question is N',N',N-tris(2-hydroxyethyl)-N-tallowyl-1,3-diaminopropane. According to the teaching of WO 82/00148, the cationically formulated emulsifiers are the only cationic components of the resin system.

In a study by Grabs and Schmidt-Naake (Macromol. Symp. 2009, 275-276, pp. 133-141), miniemulsions are prepared from 2-aminoethyl methacrylate hydrochloride and styrene, butyl acrylate and/or butyl methacrylate and are polymerized in situ, forming resin particles which on account of the positive charge of the aminoethyl methacrylate monomer, carry a positive surface charge and as a result are stabilized in the dispersion. A cationic coemulsifier that can be used in preparing the dispersion is the saturated cetyltrimethylammonium bromide, which has a quaternary N atom and therefore carries a permanent positive charge. In both cases, the positive charge is compensated by halide anions.

With further advantage, the electrocoat material of the invention comprises at least 30 ppm, preferably at least 100 ppm, more preferably at least 200 ppm, more particularly at least 250 ppm of bismuth in dissolved form, the amounts figures being based on the preparation as a whole and the amount being reckoned as Bi.

The term "bismuth", particularly in connection with the total amount of bismuth in the coating composition, refers for the purposes of the present invention preferably to optionally charged—such as positively charged, for example—cationic bismuth atoms of various valences. The bismuth here may be present in trivalent form (Bi(III)), but alternatively or additionally may be present in other oxidation states. The amount of bismuth is reckoned in each case as bismuth metal.

The amount of bismuth, calculated as metal, may be determined by means of optical emission spectrometry with inductively coupled plasma (ICP-OES).

The electrocoat material of the invention advantageously comprises a total amount of at least 30 ppm of bismuth, based on the total weight of the electrocoat material, of which at least 15 ppm of bismuth is present in a dissolved form, based on the total weight of the electrocoat material.

Preferably there is at least partly trivalent bismuth present. This bismuth may be in hydrated form and/or in the form of at least one dissolved salt and/or in the form of a complex.

The term "present in solution" in connection with the coating composition of the invention means preferably that the component is present in a form in solution in the coating composition at a coating composition temperature in a range from 18 to 40° C.

The bismuth component is preferably obtainable from at least one bismuth compound selected from the group consisting of oxides, basic oxides, hydroxides, carbonates, nitrates, basic nitrates, salicylates, and basic salicylates of bismuth, and also mixtures thereof. At least one such bismuth compound is preferably at least partly reacted in water in the presence of at least one complexing agent.

The electrocoat material of the invention advantageously comprises at least one at least bidentate complexing agent suitable for the complexing of bismuth.

The invention further relates to the use of an aqueous electrocoat material as disclosed herein for the cataphoretic electrocoating of metal surfaces, more particularly of aluminum surfaces.

The invention further relates to a method for cataphoretic electrocoating of metal surfaces, more particularly of aluminum surfaces, using an aqueous electrocoat material as disclosed herein.

The method is advantageously carried out in two stages, by immersing the metal surfaces, more particularly aluminum surfaces, into an aqueous electrocoat material of the invention and in a first stage applying a voltage in the range from 1 to 50 V and in a second stage applying a voltage in the range from 50 to 400 V, but not less than 10 V more than is applied in the first stage, and the voltage within each stage is maintained for at least 10 seconds within the respectively stated range.

Lastly, the invention also relates to an article which at least partly has metal surfaces, more particularly aluminum surfaces, which have been coated by the method of the invention.

Suitable electrically conductive substrates for producing the coated article are all such substrates that are known to the skilled person and customarily employed. The electrically conductive substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed, or Galfan, for example), and aluminized steel, aluminum, and magnesium; aluminum is especially suitable. Further suitable substrates include hot-rolled steel, high-strength steel, Zn/Mg alloys, and Zn/Ni alloys. Particularly suitable substrates are parts of bodies or else complete bodies of automobiles for production. The method of the invention can also be used for coil coating. Before the electrically conductive substrate in question is used, the substrate is preferably cleaned and/or degreased.

The electrically conductive substrate used in accordance with the invention may be a substrate pretreated with at least one metal phosphate. The electrically conductive substrate used in accordance with the invention may alternatively be a chromate substrate. Such pretreatment by phosphatizing or chromating, which normally takes place after the substrate has been cleaned and before it is dip-coated, is, in particular, a pretreatment step customary within the automobile industry. In this context it is especially desirable for a pretreatment, carried out optionally, to be designed advantageously from the standpoint of environment and/or economics. Therefore, for example, an optional pretreatment step is possible in which instead of a customary trication phosphatizing, the nickel component is omitted and instead a dication phosphatizing (comprising zinc and manganese cations and no nickel cations) is carried out on the electrically conductive substrate used in accordance with the invention, prior to coating with the aqueous coating composition (A).

It is advantageous, however, that it is possible for forego such pretreatment of the electrically conductive substrate for at least partial coating, by phosphatizing with a metal phosphate such as zinc phosphate, for example, or by chromating. In one preferred embodiment, therefore, the electrically conductive substrate used in accordance with the invention is not such a phosphatized or chromate substrate.

Prior to being coated with the aqueous electrocoat material used in accordance with the invention, the electrically conductive substrate used in accordance with the invention may be pretreated with an aqueous pretreatment composition which comprises at least one water-soluble compound containing at least one Ti atom and/or at least one Zr atom, and which comprises at least one water-soluble compound as a source of fluoride ions, containing at least one fluorine atom, or with an aqueous pretreatment composition which comprises a water-soluble compound which is obtainable by reacting at least one water-soluble compound containing at least one Ti atom and/or at least one Zr atom with at least one water-soluble compound as a source of fluoride ions, containing at least one fluorine atom.

The invention is illustrated in more detail below using working examples.

WORKING AND COMPARATIVE EXAMPLES

Comparative Example 1

Comparative Example: Producing an Aqueous Preparation for Verifying the Coating Properties with Bismuth Complex 42.60 parts of a 40% cationic electrocoating dispersion (CathoGuard® 520, commercial product from BASF Coatings GmbH) are mixed with 49.94 parts of DI water. Then 6.12 parts of an aqueous pigment preparation (CathoGuard® 520 pigment paste, commercial product of BASF Coatings GmbH) are added together with 1.34 parts of an aqueous bismuth L(+)-lactate solution, with stirring.

Inventive Examples 2, 3, and 4

Examples: Modifying the Pigment Paste and Producing an Aqueous Preparation for Verifying the Coating Properties with Bismuth Complex and Core-Shell Particles Having a Silicone Core An aqueous pigment paste based on the formula of a customary composition for use in electrocoating material (CathoGuard® 520 pigment paste, commercial product from BASF Coatings GmbH) is prepared. In this pigment paste formulation, 1%, 5%, or 10% of the grind resin typically employed, based on the solids content, is replaced, and a product is used that comprises core-shell particles, containing a silicone core (KANE ACE MX 960), and aqueous pigment pastes are produced as described above. The fractions of the product containing core-shell particles in the modified pigment paste formulation are 0.71% in example 2, 3.54% in example 3, and 6.97% in example 4.

42.60 parts of a 40% cationic electrocoating dispersion (CathoGuard® 520, commercial product from BASF Coatings GmbH) are mixed with 49.94 parts of DI water.

TABLE 1

Compositions of the test baths (all figures in parts by weight)

| | Comparative example 1 | Inventive example 2 | Inventive example 3 | Inventive example 4 |
|---|---|---|---|---|
| DI water | 49.94 | 49.94 | 49.94 | 49.94 |
| Binder dispersion CathoGuard ® 520 | 42.60 | 42.60 | 42.60 | 42.60 |
| Pigment paste (CathoGuard ® 520) | 6.12 | | | |
| Pigment paste (based on CathoGuard ® 520, | | | | |

TABLE 1-continued

Compositions of the test baths (all figures in parts by weight)

| | Comparative example 1 | Inventive example 2 | Inventive example 3 | Inventive example 4 |
|---|---|---|---|---|
| containing 6.97% Kane Ace 156) | | | | |
| Pigment paste (based on CathoGuard ® 520, containing 0.71% Kane Ace 960) | | 6.12 | | |
| Pigment paste (based on CathoGuard ® 520, containing 3.54% Kane Ace 960) | | | 6.12 | |
| Pigment paste (based on CathoGuard ® 520, containing 6.97% Kane Ace 960) | | | | 6.12 |
| Bismuth L(+)-lactate 11.9% Bi | 1.34 | 1.34 | 1.34 | 1.34 |

Then 6.12 parts of the aqueous pigment preparations described above are added together with 1.34 parts of an aqueous bismuth L(+)-lactate solution, with stirring.

Results:

Surface Quality/Defects

The defects in the grey coating that are formed in particular on aluminum substrates are rendered visible by means of a test. In this test, a further application of a black electrocoat material is carried out on the panels coated and baked as stipulated.

After rinsing and baking, the defects (pinholes) appear black, since at these locations the actual coating has holes. Evaluation takes place by counting the defects within one $cm^2$ on each of the test panels (table 2).

TABLE 2

Number of pinholes on a 1 $cm^2$ area of the test panels in question

| | Comparative example 1 | Inventive example 2 | Inventive example 3 | Inventive example 4 |
|---|---|---|---|---|
| Number of defects [per $cm^2$] | 56 | 48 | 12 | 3 |

Corrosion Control

TABLE 3

Results for corrosion/delamination after 10 days CASS test on aluminum (Copper Accelerated Acetic Acid Salt Spray Test acc. to DIN EN ISO 9227 CASS)

| | Comparative example 1 | Inventive example 2 | Inventive example 3 | Inventive example 4 |
|---|---|---|---|---|
| Corrosion/delamination [mm] | 1.5 | 2 | 1 | 0.9 |

TABLE 4

Longest thread after 42 days filiform test on aluminum (Filiform acc. to DIN EN 3665)

| | Comparative example 1 | Inventive example 2 | Inventive example 3 | Inventive example 4 |
|---|---|---|---|---|
| Longest thread [mm] | 7.8 | 8.3 | 5.5 | 4 |

What is claimed is:

1. An aqueous electrocoat material which comprises a cataphoretically depositable resin system and a pigment paste obtained by a method comprising:
   mixing at least one pigment, in the form of solid particles, with a grind resin in the presence of at least one of water or an organic liquid, thereby obtaining a pigment paste
   wherein the grind resin comprises a dispersion of core-shell particles in an epoxide prepolymer which is liquid at 20° C., and the core-shell particles have a silicone core and a polymer shell.

2. The aqueous electrocoat material as claimed in claim 1, wherein the resin system comprises at least one epoxide-based monomer or at least one prepolymer and at least one curing agent for epoxides.

3. The aqueous electrocoat material as claimed in claim 1, which is in the form of a miniemulsion.

4. The aqueous electrocoat material as claimed in claim 1, which comprises at least 30 ppm of bismuth in dissolved form, based on the total preparation, wherein calculated amount is based on the amount of bismuth metal in the aqueous electrocoat material.

5. The aqueous electrocoat material as claimed in claim 1, which comprises at least 100 ppm of bismuth in dissolved form, based on the total preparation, wherein calculated amount is based on the amount of bismuth metal in the aqueous electrocoat material.

6. The aqueous electrocoat material as claimed in claim 1, which comprises at least 200 ppm of bismuth in dissolved form, based on the total preparation, wherein calculated amount is based on the amount of bismuth metal in the aqueous electrocoat material.

7. The aqueous electrocoat material as claimed in claim 1, which comprises at least 250 ppm of bismuth in dissolved form, based on the total preparation, wherein calculated amount is based on the amount of bismuth metal in the aqueous electrocoat material.

8. The aqueous electrocoat material as claimed in claim 1, wherein the method further comprises homogenizing a pigment paste obtained from said mixing.

9. The aqueous electrocoat material as claimed in claim 8, wherein the pigment particles, during said homogenizing, are comminuted to a preselected particle size and dispersed by introduction of mechanical energy.

10. The aqueous electrocoat material as claimed in claim 1, wherein the polymer shell of the core-shell particles comprises at least one poly(meth)acrylate.

11. The aqueous electrocoat material as claimed in claim 1, wherein the epoxide prepolymer has an epoxy equivalent weight in the range from 150 to 300 g/eq.

12. The aqueous electrocoat material as claimed in claim 1, wherein the dispersion of core-shell particles is present in an epoxide prepolymer, in an amount such that the pigment paste obtained from said mixing comprises 1 to 6 wt % of core-shell particles, based on the total amount of the grind resin.

13. A method for cataphoretic electrocoating of metal surfaces, comprising:
   contacting a metal surface with the aqueous electrocoat material as claimed in claim 1.

14. The method as claimed in claim 13, wherein said contacting comprises:
   (1) immersing the metal surface with said aqueous electrocoat material
   (2) applying, for at least ten seconds, a voltage in a range of from 1 to 50 V to the immersed metal surface; and
   (3) applying, for at least ten seconds, a voltage in a range of from 50 to 400 V to the immersed metal surface, provided the voltage applied during said (3) applying is not less than 10 V more than the voltage applied during said (2) applying.

15. The method according to claim 13, wherein the metal surface is an aluminum surface.

* * * * *

UNITED STATES PATENT AND TRADEMARK OFFICE
CERTIFICATE OF CORRECTION

PATENT NO. : 10,174,212 B2  
APPLICATION NO. : 15/106574  
DATED : January 8, 2019  
INVENTOR(S) : Herrmann et al.

Page 1 of 1

It is certified that error appears in the above-identified patent and that said Letters Patent is hereby corrected as shown below:

On the Title Page

Item [57], Line 2, delete "past" and insert -- paste --, therefor.

In the Specification

Column 3, Line 40, delete "example" and insert -- example. --, therefor.

Signed and Sealed this  
Fourteenth Day of April, 2020

Andrei Iancu  
*Director of the United States Patent and Trademark Office*